US008416829B1

(12) United States Patent
Soufli et al.

(10) Patent No.: US 8,416,829 B1
(45) Date of Patent: Apr. 9, 2013

(54) CORROSION-RESISTANT MULTILAYER STRUCTURES WITH IMPROVED REFLECTIVITY

(75) Inventors: Regina Soufli, Berkeley, CA (US); Monica Fernandez-Perea, Pleasanton, CA (US); Jeff C. Robinson, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/280,256

(22) Filed: Oct. 24, 2011

(51) Int. Cl.
*H01S 3/08* (2006.01)
(52) U.S. Cl. .... 372/99; 372/102; 372/50.11; 372/49.01; 372/39
(58) Field of Classification Search .................... 372/99, 372/102, 50.11, 49.01, 39
See application file for complete search history.

(56) References Cited

U.S. PATENT DOCUMENTS

| 6,335,099 B1 * | 1/2002 | Higuchi et al. ............... 428/469 |
| 2006/0072436 A1 * | 4/2006 | Mizushima et al. ....... 369/275.1 |
| 2009/0233037 A1 * | 9/2009 | Medwick et al. ............... 428/68 |

\* cited by examiner

*Primary Examiner* — Kinam Park
(74) *Attorney, Agent, or Firm* — Dominic M. Kotab

(57) ABSTRACT

In one general embodiment, a thin film structure includes a substrate; a first corrosion barrier layer above the substrate; a reflective layer above the first corrosion barrier layer, wherein the reflective layer comprises at least one repeating set of sub-layers, wherein one of the sub-layers of each set of sub-layers being of a corrodible material; and a second corrosion barrier layer above the reflective layer. In another general embodiment, a system includes an optical element having a thin film structure as recited above; and an image capture or spectrometer device. In a further general embodiment, a laser according to one embodiment includes a light source and the thin film structure as recited above.

29 Claims, 10 Drawing Sheets

CORROSION-RESISTANT MULTILAYER STRUCTURES WITH IMPROVED REFLECTIVITY

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to reflective or diffractive structures having corrosion protection layers, and particularly, to multilayer structures.

BACKGROUND

Magnesium silicon carbide (SiC/Mg) has important applications, for example as mirror coating for solar physics, spectroscopy, plasma physics, photolithography instrumentation and applications related to tabletop extreme ultraviolet (EUV) laser sources. Unfortunately, this Multilayer is extremely prone to degradation exhibited as corrosion spots which randomly and sporadically develop on the SiC/Mg coatings, and are attributed to the corrosion of the Mg layers inside the multilayer after exposure to environmental species such as air and humidity. Thus, the poor aging properties of this multilayer prevent its use in applications which require long-term stability.

SiC/Mg was initially selected and implemented as the reflective coating for NASA's Solar Dynamics Observatory (SDO) solar space mission, to image the solar corona He II and Fe XVI spectral lines at 30.4 and 33.5 nm, respectively. However, due to the poor aging properties of SiC/Mg, corrosion spots developed thus leading to performance degradation. As a result, such characteristic tendencies toward corrosion have prevented SiC/Mg from being widely used.

Alternatively, silicon carbide silicon (SiC/Si) multilayers for 30.4 and 33.5 nm have been used on SDO instead of SiC/Mg. In such cases, however, the use of SiC/Si dramatically decreased the throughput of the 2-mirror telescope camera at 30.4 and 33.5 nm by a factor of 10, due to much lower reflectivity of SiC/Si compared to SiC/Mg.

So far, all prior research and publications devoted to the development of these coatings have been focused on the optical performance (reflective properties) of the coatings, measured on un-corroded regions within the coated area, and do not address the corrosion phenomena. However, this approach is clearly incomplete since the aging properties largely determine the usefulness of these coatings in space and in other applications where good lifetime stability is essential.

Therefore, it would be beneficial to the field of reflective and refractive optics to be able to identify corrosion-resistant multilayer structures along with high peak reflectivity, low stress and high thermal stability in the extreme ultraviolet spectral range that are also capable of avoiding the problems associated with corrodible materials.

SUMMARY

A thin film structure according to one embodiment includes a substrate; a first corrosion barrier layer above the substrate; a reflective layer above the first corrosion barrier layer, wherein the reflective layer comprises at least one repeating set of sub-layers, wherein one of the sub-layers of each set of sub-layers being of a corrodible material; and a second corrosion barrier layer above the reflective layer.

A thin film structure according to another embodiment includes a substrate; a first corrosion barrier layer above the substrate; a reflective layer above the first corrosion barrier layer, wherein the reflective layer comprises at least one repeating set of sub-layers, wherein one of the sub-layers of each set of sub-layers being primarily of magnesium; and a second corrosion barrier layer above the reflective layer, where at least one of the corrosion barrier layers primarily of a material selected from a group consisting of aluminum, silicon oxide, sputtered carbon, and boron carbide.

A system according to one embodiment includes an optical element having a thin film structure as recited above; and an image capture or spectrometer device.

A laser according to one embodiment includes a light source and the thin film structure as recited above.

Other aspects and embodiments of the present invention will become apparent from the following detailed description, which, when taken in conjunction with the drawings, illustrate by way of example the principles of the invention.

DETAILED DESCRIPTION

Figure 1:
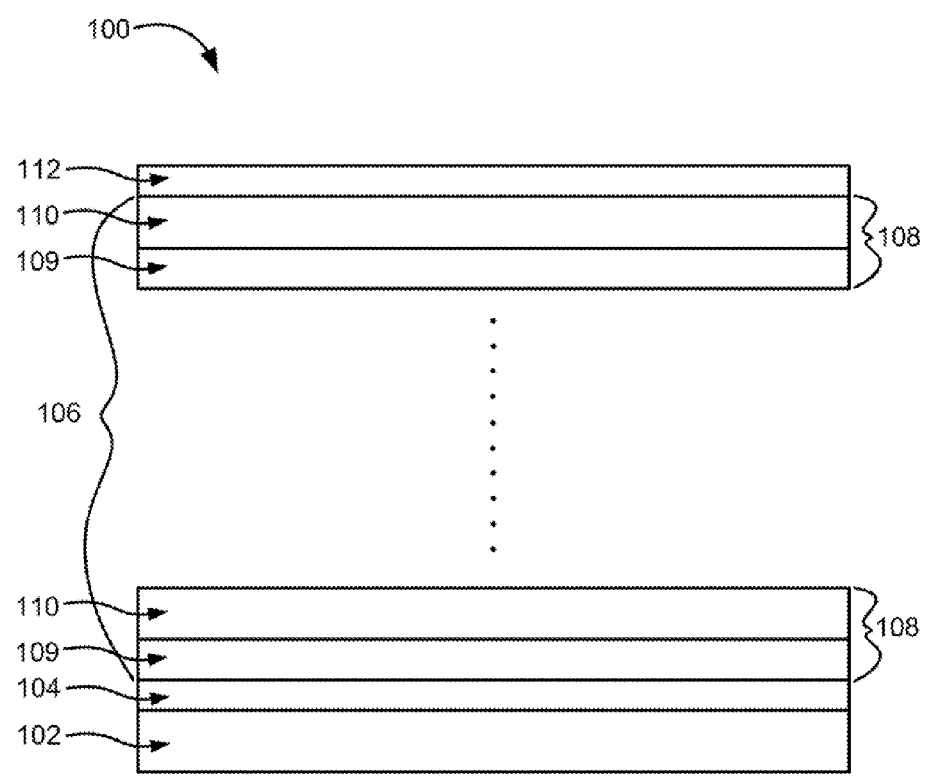
FIG. 1 is a cross sectional view of a thin film structure according to one embodiment.

The following description is made for the purpose of illustrating the general principles of the present invention and is not meant to limit the inventive concepts claimed herein. Further, particular features described herein, including any incorporated description, can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In one general embodiment, a thin film structure includes a substrate; a first corrosion barrier layer above the substrate; a reflective layer above the first corrosion barrier layer, wherein the reflective layer comprises at least one repeating set of sub-layers, wherein one of the sub-layers of each set of sub-layers being of a corrodible material; and a second corrosion barrier layer above the reflective layer.

In another general embodiment, a thin film structure includes a substrate; a first corrosion barrier layer above the substrate; a reflective layer above the first corrosion barrier layer, wherein the reflective layer comprises at least one repeating set of sub-layers, wherein one of the sub-layers of each set of sub-layers being primarily of magnesium; and a second corrosion barrier layer above the reflective layer, where at least one of the corrosion barrier layers primarily of a material selected from a group consisting of aluminum, silicon oxide, sputtered carbon, and boron carbide.

In yet another general embodiment, a system includes an optical element having a thin film structure as recited above; and an image capture or spectrometer device.

In a further general embodiment, a laser according to one embodiment includes—a light source and the thin film structure as recited above.

Referring now to FIG. 1, a thin film structure 100 is shown in accordance with one embodiment. As depicted in FIG. 1, a thin film structure 100 may include a substrate 102.

In various approaches, a substrate 102 may be constructed of silicon, silicon-carbide, single crystal, crystalline, or amorphous silicon, etc. or any other silicon that may be apparent in various embodiments to one of skill in the art upon reading the present description. In another approach, a substrate 102 may be constructed of glass which include's, but is not limited to lithium aluminosilicate glass ceramics, such as ZERODUR from Schott Glass Technologies and sold by United Lens Company having an office at 259 Worcester Street Southbridge, Mass. 01550-1325; ultra-low expansion titania-silica binary glass such as ULE brand glass sold by United Lens Company having an office at 259 Worcester Street Southbridge, Mass. 01550-1325; fused silica, boro-silicates, etc. or any other glass that would be apparent in various embodiments to one of skill in the art upon reading the present description.

In yet another approach, a substrate 102 may be constructed of a metal or metallic alloy, which may include aluminum, molybdenum, etc. or any other metal that may be apparent in various embodiments to one of skill in the art upon reading the present description.

Similarly, in one approach, a substrate 102 may include a ceramic which may include silicon carbide, silicon nitride, etc. In a preferred approach, a substrate may be formed from bulk material silicon carbide, due to its desirable properties including, but not limited to being very lightweight.

In another approach, a substrate 102 may be constructed of a polymer which may include polycarbonate, polyimide, nitrocellulose, photoresist such as polymethyl methacrylate (PMMA), spin-on-glass (SOG), etc. or any other polymer which may be apparent in various embodiments to one of skill in the art upon reading the present description.

Furthermore, in one approach, the thickness of a substrate may be any value within a range spanning from a fraction of one micron to several millimeters, and thicker, e.g., to several inches (e.g., 1-4 inches), depending on the application. Thin film membrane substrates (free-standing or supported) are also included in this description of substrates.

The thin film structure 100 may further include a first corrosion barrier layer 104 above the substrate 102. The first corrosion barrier layer 104 is preferably directly on the substrate 102, but interposed layers may be present.

In one approach, a first corrosion barrier layer 104 may comprise silicon oxide, sputtered carbon, boron carbide, aluminum, etc. or any other corrosion barrier layer in various embodiments that would be apparent to one of skill in the art upon reading the present description. For example, the first corrosion barrier layer 104 may be primarily of a material selected from a group consisting of aluminum, silicon oxide, sputtered carbon, and boron carbide. "Primarily of a material" in the context of the present description is meant to be interpreted as the composition of the first corrosion barrier layer 104 is greater than 50 wt % of the material. In an ideal embodiment, the composition is about 100 wt % of the material, though presence of up to 2 wt % impurities is acceptable and considered to be within the scope of about 100% of one material listed in the group.

In various approaches, the first corrosion barrier layer 104 may have a thickness of any value in a range spanning from about 2 to about 60 nm, preferably from about 5 to about 30 nm, or higher or lower, depending on the application. A thicker first corrosion barrier layer 104 may be used for applications that require and/or desire added protection for the sub-layers.

In an alternate embodiment, an optional base layer (404, FIG. 4) may be included above the first corrosion barrier layer 104, and preferably directly on the first corrosion barrier layer. The base layer 404 may be constructed of any suitable material, including but not limited to silicon carbide, etc.

In yet another alternate embodiment, the first corrosion barrier layer 104 may not be present. For example, the reflective layer 106, described immediately below, and/or a base layer may be formed on the substrate 102, with an upper corrosion barrier layer 112 above the reflective layer 106.

With continued reference to FIG. 1, the thin film structure 100 may further include a reflective layer 106 above the first corrosion barrier layer 104. The reflective layer 106 may include at least one repeating set 108 of sub-layers, where one of the sub-layers 110 of each set 108 of sub-layers may be of a corrodible material.

In one approach, each sub-layer of a repeating set may have a thickness on the nanometer scale, e.g., less than about 100 nm, preferably less than about 50 nm. Similarly, in another approach, within each repeating set of sub-layers, the thickness of the layers may be the same or different. Moreover, the thicknesses of the layers in a given set may differ from the thicknesses of some, or all of the sub-layers of other sets. Appropriate thicknesses may be selected based on the application of the thin film structure 100, especially on the wavelength region of its operation.

The compositions of the sub-layers may be the same, or may vary, from set to set.

In a further approach, the repeating set of sub-layers may be repeated from about 20 to about 35 times within the thin film structure, but could also be less than 20 or more than 35, depending on the application. Without wishing to be bound by any theory, it is believed that the number and character of repeating sub-layers within each set determines the characteristics of the overall reflectance curve of the thin film structure according to one embodiment.

With continued reference to FIG. 1, in one approach, the repeating set of sub-layers may constitute, but is not limited to a bilayer. In one approach, one 109 of the sub-layers may be constructed primarily of silicon carbide. Similarly, another 110 of the sub-layers in the set 108 may be constructed primarily of magnesium, which may be the aforementioned corrodible material. "Primarily of magnesium" in the context of the present description is meant to be interpreted as the composition of the sub-layer is greater than 50 wt % magnesium. In an ideal embodiment, the composition is about 100 wt % magnesium, though presence of up to 2 wt % impurities is acceptable and considered to be within the scope of about 100% magnesium. "Primarily of silicon carbide" is meant to have similar constraints.

An illustrative thicknesses of the silicon carbide sub-layer 109 in the illustrative embodiment, is about 2 to about 15 nm, but could be higher or lower. An illustrative thicknesses of the primarily magnesium sub-layer 110 in the illustrative embodiment, is about 4 to about 35 nm, but could be higher or lower.

Further approaches may include any other sub-layer materials which would be apparent to one of skill in the art upon reading the present description.

Figure 2:
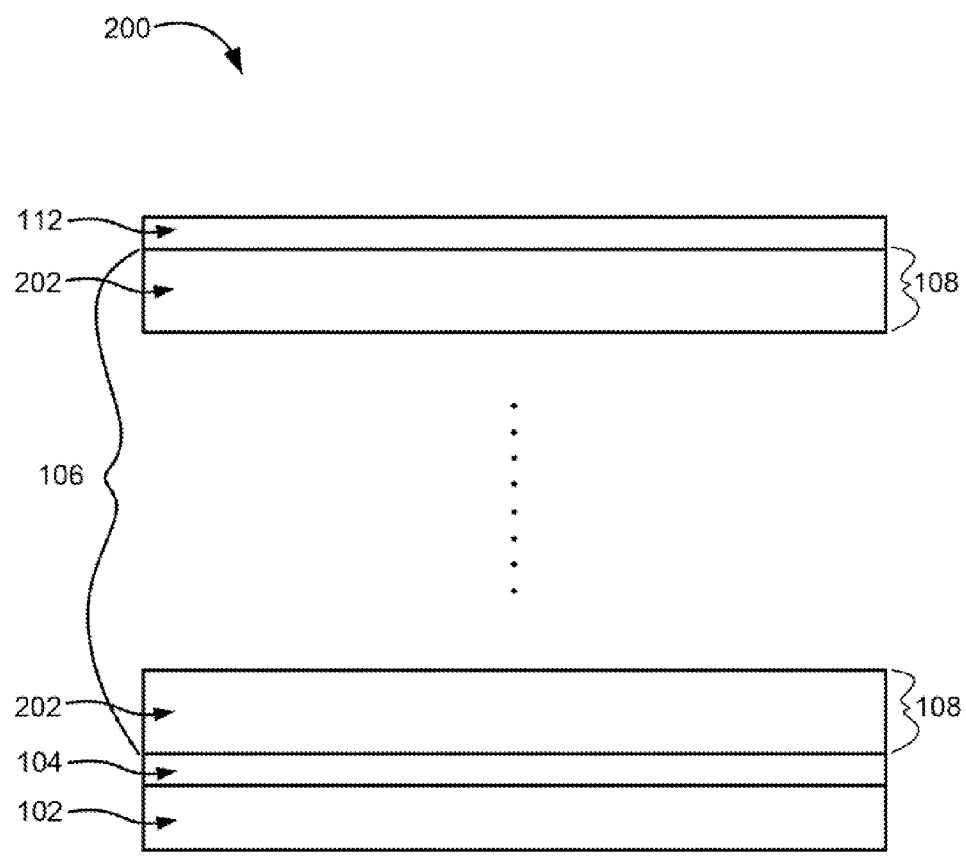
FIG. 2 is a cross sectional view of a thin film structure according to one embodiment.

As depicted in FIG. 2, in one approach, a thin film structure 200 such as 100 of FIG. 1, where the repeating set of sub-layers 108 may constitute, but is not limited to a monolayer 202. In one approach, the monolayer may be a magnesium layer which may serve as a corrodible material. Further approaches may include any other sub-layer materials which would be apparent to one of skill in the art upon reading the present description.

In another approach, each set of sub-layers may include at least three sub-layers, where according to the present approach, none of the three sub-layers may be considered a corrosion barrier layer. For example, an embodiment with three sub-layers may have repeating sets of scandium, silicon carbide, and magnesium sub-layers, respectively.

The thin film structure 100 may further include a second corrosion barrier layer 112 above the reflective layer 106. Various embodiments may include a second corrosion barrier layer having a thickness in a wide range, which may depend on the wavelength of light which is being targeted, or other desired effect for the various possible applications of the thin film structure 100.

In various approaches, the second corrosion barrier layer 112 may have a thickness of any value in a range spanning from about 2 to about 60 nm, preferably from about 5 to about 30 nm, or higher or lower, depending on the application. A thicker second corrosion barrier layer 112 may be used for applications that require and/or desire added protection for the sub-layers.

The composition of the second corrosion barrier layer 112 may have any of the potential compositions set forth above for the first corrosion barrier layer 104. Note, however, that while the first and second corrosion barrier layers may have the same composition in some embodiments, they may have different compositions in other embodiments.

In one illustrative embodiment, a thin film structure may have a substrate, a first corrosion barrier layer above the substrate, a reflective layer above the first corrosion barrier layer, where the reflective layer may comprise at least one repeating set of sub-layers, where one of the sub-layers of each set of sub-layers may be primarily of magnesium; and a second corrosion barrier layer above the reflective layer, where at least one of the corrosion barrier layers may be primarily of a material selected from a group consisting of aluminum, silicon oxide, sputtered carbon, and boron carbide.

In one approach, at least one of the corrosion barrier layers may be primarily of a material selected from a group consisting of silicon oxide, sputtered carbon, and boron carbide. In a preferred approach, at least one of the corrosion barrier layers may be primarily of aluminum. "Primarily of a material" in the context of the present description is meant to be interpreted as the composition of the layer is greater than 50 wt % of the noted material. In an ideal embodiment, being primarily of aluminum for example, the composition is about 100 wt % aluminum, though presence of up to 2 wt % impurities is acceptable and considered to be within the scope of about 100% aluminum.

An aluminum-containing corrosion barrier layer is particularly preferred in optical embodiments having magnesium-containing sub-layers, because not only has aluminum been discovered to greatly reduce incidences of corrosion of the magnesium material, but without wishing to be bound by any theory, it is believed that aluminum may have close similarities in optical properties relative to magnesium in the 25-70 nm wavelength of light region. Therefore, it is believed that aluminum may work well with other materials in the sub-layers with similar optical properties.

In addition, the inventors have surprisingly and unexpectedly discovered that the second corrosion barrier layer and the immediately underlying sub-layer of the reflective layer constitute an interdiffusion layer in some embodiments, which results in enhanced corrosion protection. This result could not have been predicted.

Figure 5:
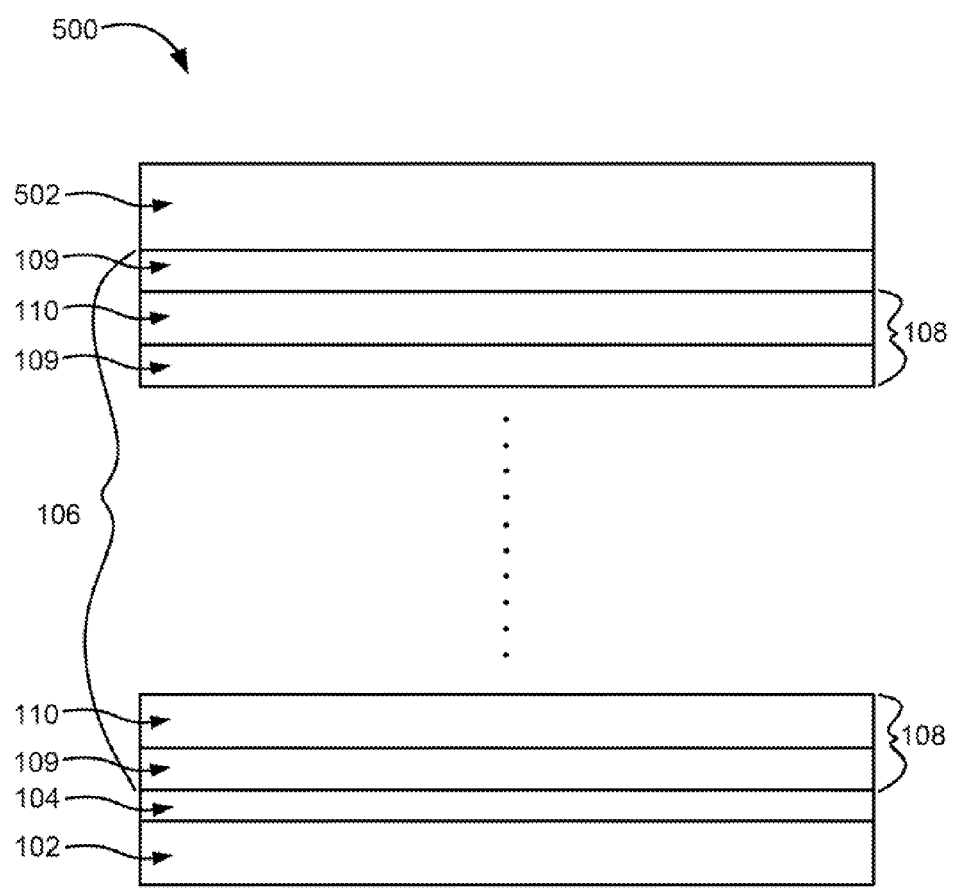
FIG. 5 is a cross sectional view of a thin film structure according to one embodiment.

Referring now to FIG. 5, a thin film structure 500 is shown in accordance with one approach, similar to that depicted by thin film structure 100 of FIG. 1. As shown in FIG. 5, a thin film structure 500 where the second corrosion barrier layer and the immediately underlying sub-layer of the reflective layer constitute an interdiffusion layer 502. In a preferred embodiment the corrosion barrier material may consist essentially of aluminum and the immediately underlying sub-layer of the reflective layer may comprise magnesium.

In various approaches, the interdiffusion layer has no visible boundary between the second corrosion barrier layer and the immediately underlying sub-layer. For example, the layer boundary within the interdiffusion layer 502 is not visible when a cross-section of the structure is observed by transmission electron microscopy under 25K magnification.

In some approaches according to any of the embodiments disclosed herein, the second corrosion barrier layer and the immediately underlying sub-layer of the reflective layer constitute an interdiffusion layer having a mostly (e.g., <50%) amorphous character.

in one experiment where an upper sub-layer of a multilayer thin film reflective structure consisting essentially of magnesium was formed, a process to sputter a second corrosion barrier layer consisting essentially of aluminum directly thereon resulted in formation of a interdiffusion layer that had no visible boundary between the expected second corrosion barrier layer and the immediately underlying sub-layer. Surprisingly and contrary to conventional wisdom, the aluminum corrosion barrier layer and the immediately underlying magnesium sub-layer physically intermixed to form an aluminum magnesium alloy which results in enhanced corrosion protection. This result was not expected.

Furthermore, surprisingly and contrary to conventional wisdom, while the individual magnesium and aluminum layers deposited were mostly crystalline in structure, the interdiffused aluminum magnesium alloy layer was mostly amorphous. This result was also not expected nor predictable. Without wishing to be bound by any theory, it is believed that the mostly amorphous nature of the interdiffused aluminum magnesium alloy layer may contribute towards the enhanced corrosion protection observed. "Mostly amorphous" in the context of the present description is meant to be interpreted as at least a majority of the interdiffused aluminum magnesium alloy layer being amorphous.

Without wishing to be bound by any theory, it is currently believed that due to the small scale of the thin films which were used, different results were obtained than what would have been expected when using bulk materials, thus resulting in greatly unpredicted results. It is believed that the nature as well as the physics of thin film materials compared to their corresponding bulk form, are markedly different.

Furthermore, surprisingly upon intermixing, and again contrary to what would be expected by one skilled in the art, the intermixed alloy interdiffusion layer actually either greatly reduces or completely eliminates all corrosion in the multilayer reflective structures that were tested.

Without wishing to be bound by any theory, it is also believed that the thickness of the alloy layer is the sum of the two thicknesses of the individual aluminum layer and the magnesium layer. However, it is believed that this intermixed alloy layer causes the second corrosion barrier layer to act as if it were effectively thicker, thus giving better corrosion protection without sacrificing system performance. This theory is supported by the surprising results seen in that corrosion protection greatly increased although the second corrosion barrier layer was not increased in size or opaqueness.

Thus, the interdiffusion layer may be considered to be a second corrosion barrier layer in some approaches, as well as a second corrosion barrier layer and a sub-layer of the uppermost set of sub-layers of the reflective layer in some approaches.

In an additional embodiment, a magnesium sub-layer could be positioned directly above the first aluminum corrosion protection layer to form an intermixed aluminum magnesium alloy layer below the sets of sub-layers. In still another embodiment, an intermixed aluminum magnesium alloy layer could be formed both above the sets of sub-layers as well as below the sets of sub-layers.

In a preferred approach, one or more of the corrosion protection layers may be mostly transparent, e.g., at least 90% transparent in the target wavelength range, preferably at least 98% transparent, so as to not counteract the efficiency of the reflective multilayer.

In a preferred configuration, a thin film structure may have a silicon carbide and magnesium (SiC/Mg) bilayer sub-layer with an aluminum corrosion protection layer. SiC/Mg multilayer reflective coatings have been found to be the best normal-incidence multilayer reflective coating for the spectral range of 25-70 nm according to a wide range of applications.

Without wishing to be bound by any theory, it is believed that exceptional functionality of SiC/Mg multilayer is due to a combination of the highest reflectivity (in some cases by a factor of 2), lifetime stability, near-zero film stress (where high stress levels may cause delamination of the coating), excellent spectral selectivity and thermal stability to about 300° C., compared to other possible multilayer material pairs, such as Mo/Si, SiC/Si, Si/B4C, Sc/Si, SiC/Al, etc. and those known in the art. In a preferred embodiment, the desirable functionalities discussed above of a multilayer including, but not limited to magnesium are conserved in combination with successfully preventing corrosion within the multilayer.

Figure 3:
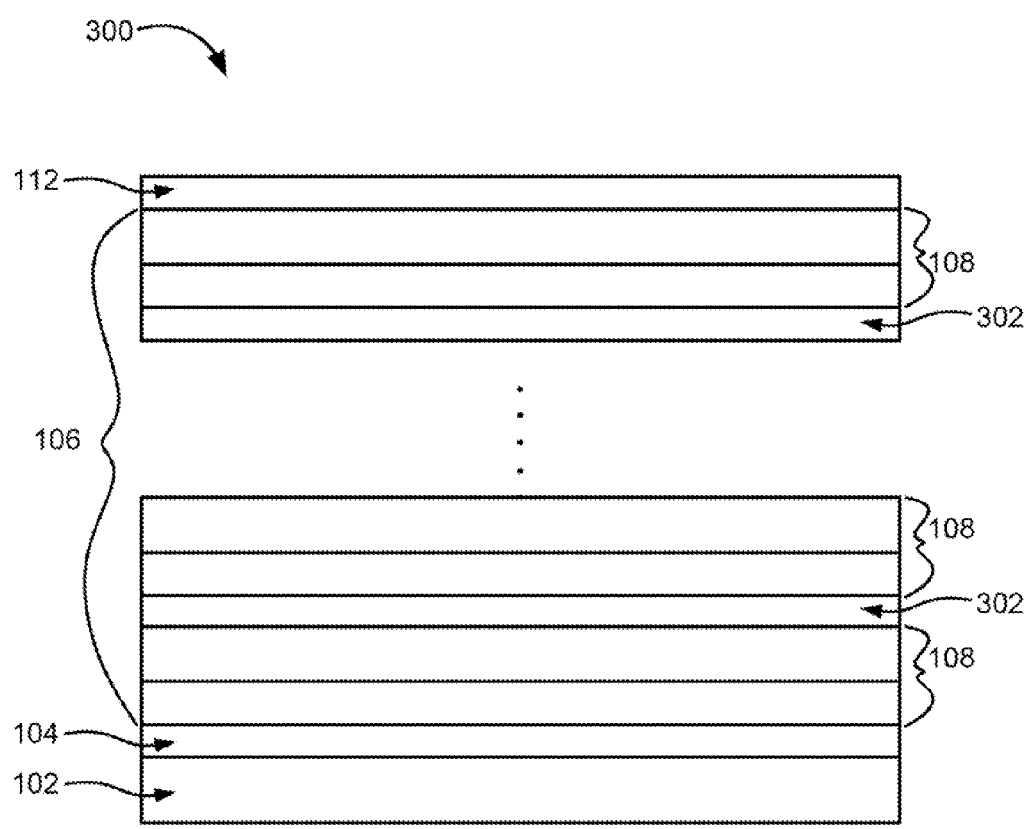
FIG. 3 is a cross sectional view of a thin film structure according to one embodiment.

Referring now to FIG. 3, a thin film structure 300 is shown in accordance with one approach, and may be similar to that depicted by thin film structure 100 of FIG. 1. As shown in FIG. 3, a thin film structure 300 may include a third corrosion barrier layer 302 between at least two of the sets of sub-layers 108 of the reflective layer 106.

In one approach, a third corrosion barrier layer may be between each of the sets of sub-layers of the reflective layer. In another approach, a third corrosion barrier layer may be between only one pair of sets of sub-layers of the reflective layer. In yet another approach, a third corrosion barrier layer may be applied between every other set of the sub-layers of the reflective layer, every third pair of sets of sub-layers of the reflective core, in irregular locations, or a combination thereof.

Figure 4:
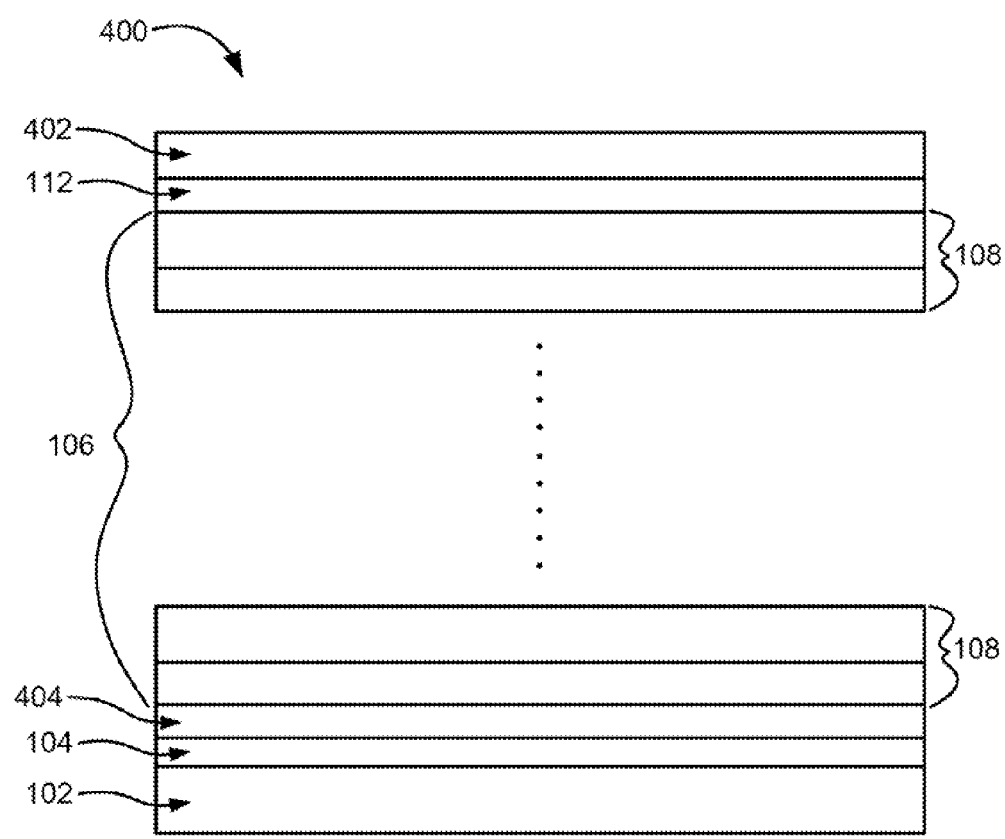
FIG. 4 is a cross sectional view of a thin film structure according to one embodiment.

Referring now to FIG. 4, a thin film structure 400 is shown in accordance with one approach, and may be similar to that depicted by thin film structure 100 of FIG. 1. As shown in FIG. 4, a thin film structure 400 including a cap layer 402 above the second corrosion barrier layer 112.

In various approaches, a cap layer of a thin film structure may include any of the same material as that of the sub-layers 108 disclosed above, including, but not limited to silicon or silicon carbide, or any other cap layer that may be apparent in various embodiments to one of skill in the art upon reading the present description. In yet another approach, the cap layer may be included in a thin film structure so as to protect the underlying layers from physical damage, oxidation or other type of contamination. Also preferably, the cap layer may be of a material which is not inherently corrosive.

In one approach, the second corrosion barrier layer may be the sole cap layer of the thin film structure. Thus, there may be no additional layers overlying the second corrosion barrier layer.

In another approach, the second corrosion barrier layer may be directly on the reflective layer, where the second corrosion barrier layer may be an alloy of a corrosion barrier material and a material of an immediately underlying sub-layer of the reflective layer. "Directly on" in the context of a preferred embodiment of the present description is meant to be interpreted as having two layers that physically share an interface therebetween.

In various approaches, one, some or all of the layers of any of the thin film structure configurations discussed herein or any other approach which would be apparent to one of skill in the art upon reading the present description may be applied by different, similar and/or the same technique. One approach may include one, some or all of the layers being applied by a technique, which may include, DC magnetron sputtering, RF magnetron sputtering, ion-beam sputtering, electron-beam evaporation, pulsed laser deposition, chemical vapor deposition, atomic layer deposition (ALD), other epitaxial deposition techniques, thermal evaporation, etc. or any other technique which would be apparent to one of skill in the art upon reading the present description.

One approach may include a system, which may incorporate one or a plurality of optical elements, including but not limited to mirrors, filters, reflective or diffractive gratings, diffractive lenses, beam splitters, phase retardation or pulse compression devices, any of which may have a thin film structure according to any approach described herein, or any other configuration that may be apparent in various embodiments to one of skill in the art upon reading the present description. Various approaches may include an image capture device such as a camera of a type known in the art, or any of various component parts of a camera, or spectrometer capable of detecting light in the wavelengths of operation of the aforementioned optical elements.

In a further approach, a laser may include a light source and a thin film structure. According to various approaches, a thin film structure may incorporate any approach previously described herein, or any other configuration that may be apparent in various embodiments to one of skill in the art upon reading the present description.

There are many scientific disciplines and technologies that would benefit from a thin film structure having one or more of the corrosion barrier layers, thereby enabling creation of corrosion resistant SiC/Mg multilayer mirrors, which in some embodiments are operational in the spectral range from about 25 to about 70 nm. These benefits may be due to the combination of the highest reflectivity (in some cases by a factor of 2), lifetime stability, near-zero film stress, excellent spectral selectivity and thermal stability to about 300 degrees C., compared to other potential multi layer material pairs.

One major application of various embodiments may be space telescopes for solar physics and space weather investigations, since the sun has several prominent emission lines in the ~25-70 nm wavelength region. Space telescopes, especially ones used in satellites, are very expensive not only to build, but also to transport, install and launch. With corrosion being such a prominent problem in the past, many projects were forced to sacrifice performance of the reflective layers within these telescopes in an attempt to gain material stability. Now, projects using the highest-performance materials are viable.

In addition, various embodiments may be implemented in photoelectron microscopy devices that use multilayer coated Schwarzschild objectives tuned at the He II 30.4 nm-line. Further embodiments may include table-top capillary discharge extreme ultraviolet (EUV) lasers emitting at about 46.9 nm, which in turn enables the application of techniques that had been traditionally limited to large-scale facilities, such as EUV lithography and high resolution EUV microscopy, in smaller laboratories. Other applications of table-top EUV lasers that would benefit from the implementation of the inventive high-performance corrosion resistant SiC/Mg multilayers include interferometry of dense plasmas, spectroscopy, semiconductor lithography, the study of x-ray interactions with matter and the measurement of optical constants, materials ablation, the characterization of soft x-ray optics, and nanopatterning (photolithography), to name a few.

Figure 6A:
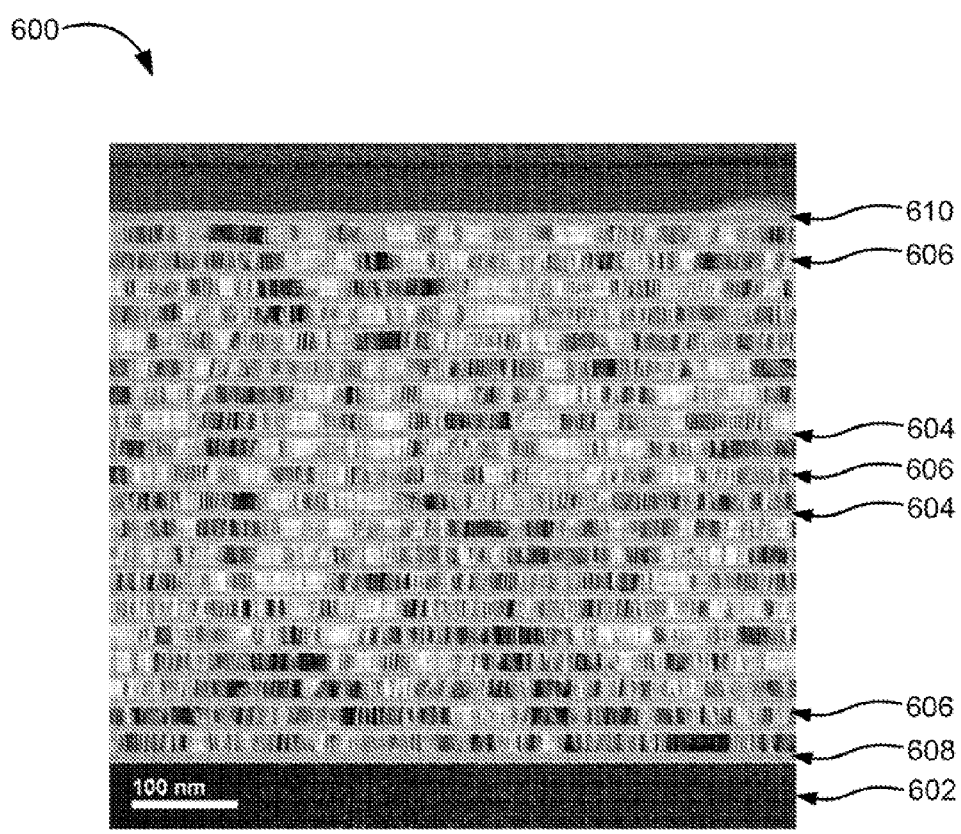
FIG. 6A depicts a cross-sectional view of a thin film structure without corrosion barrier layers.

FIG. 6A depicts a cross-sectional view of a thin film structure 600, obtained by Transmission Electron Microscopy (TEM). The thin film structure 600 is an illustrative example of a conventional multilayer structure without corrosion protection, according to a conducted experiment where the thin film structure 600 was allowed to age for approximately 3.5 years under conditions that would normally be seen in terrestrial applications, e.g., storage mainly at or below room temperature, air atmosphere, normal levels of humidity, etc. The thin film structure 600 includes a silicon substrate 602, and a stack of silicon carbide 604 and magnesium 606 sub-layers, where the base layer 608 and the cap layer 610 both consist of silicon carbide sub-layers.

Figure 6B:
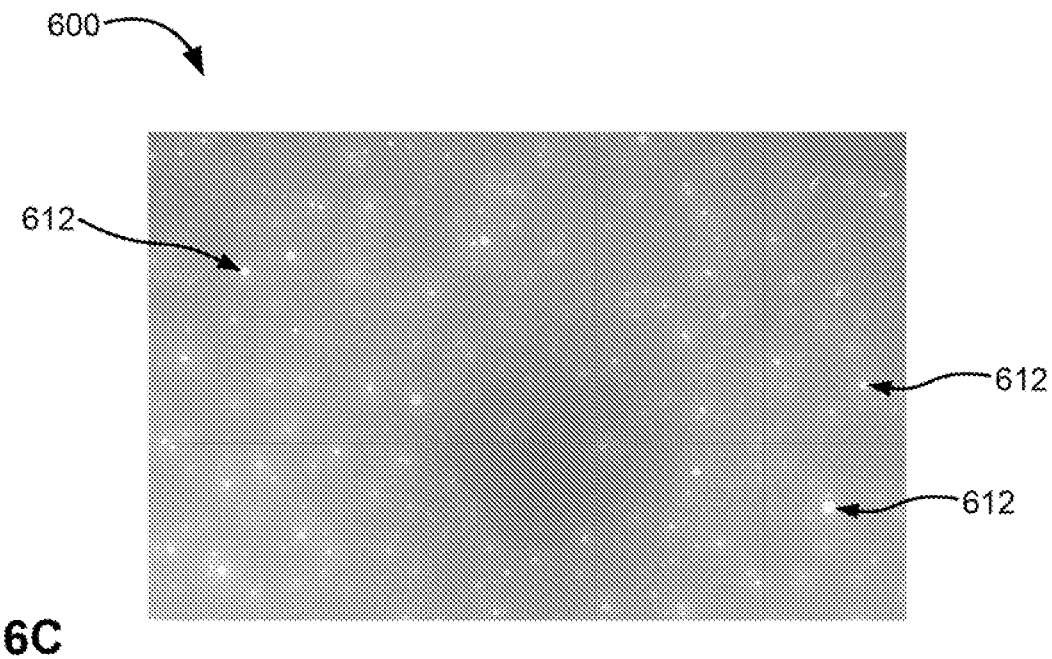
FIG. 6B is a top view of the thin film structure of FIG. 6A.
Figure 6C:
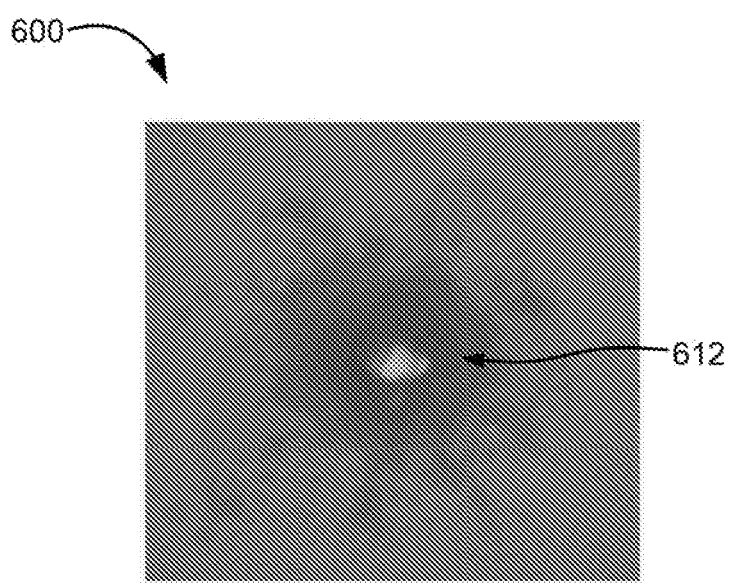
FIG. 6C is a magnified view of one of the corrosion spots of FIG. 6B.

FIG. 6B depicts a top view of the thin film structure 600 of FIG. 6A, with further magnification, obtained using a Scanning Electron Microscope (SEM). Corrosion spots 612 are seen to have formed on the sub-layers of the thin film structure 600. The corrosion spots 612 are seen to be prevalent within a given area of the thin film structure 600 which again is without corrosion protection. Furthermore, FIG. 6C depicts a detailed view, with further magnification of one of the corrosion spots 612 of FIG. 6B, again obtained using a SEM.

Figure 7:
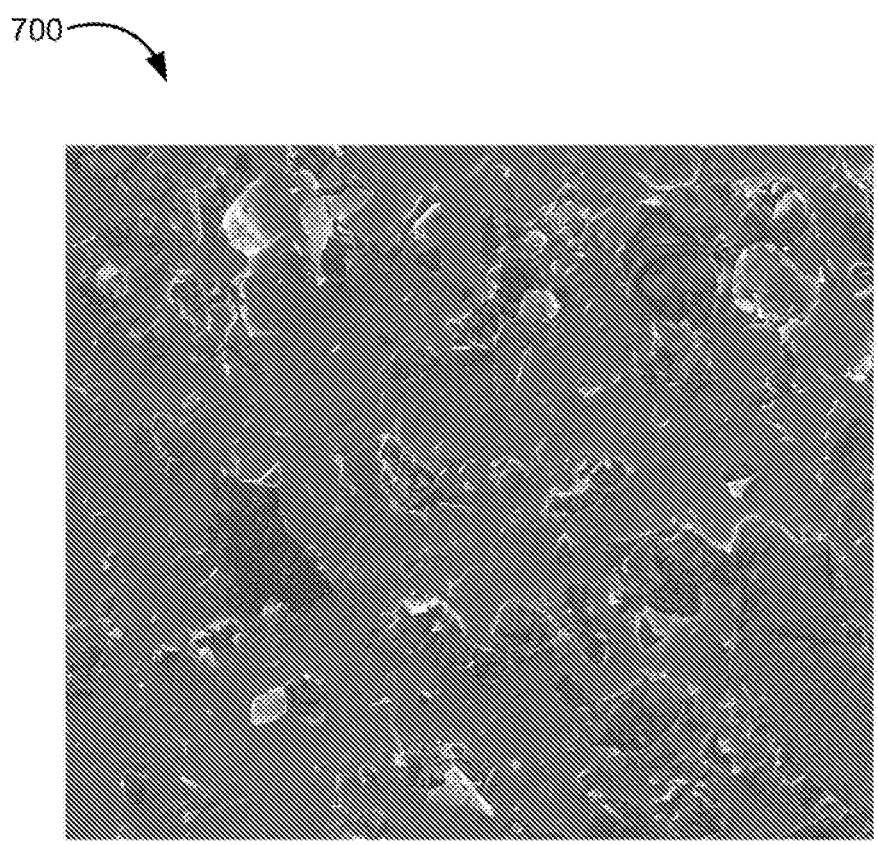
FIG. 7 is a top view of corroded areas of a thin film structure without corrosion barrier layers.

FIG. 7 depicts a top view obtained using a SEM, of corroded areas of a SiC/Mg thin film structure 700 according to one conducted experiment. The thin film structure 700 was not constructed with any specific corrosion protection added, and was allowed to age for 2.5 years under conditions that would normally be seen in terrestrial applications. It can be seen that as a result, portions from the top of the multilayer are partially or entirely delaminated due to corrosion of the sub-layers.

Figure 8A:
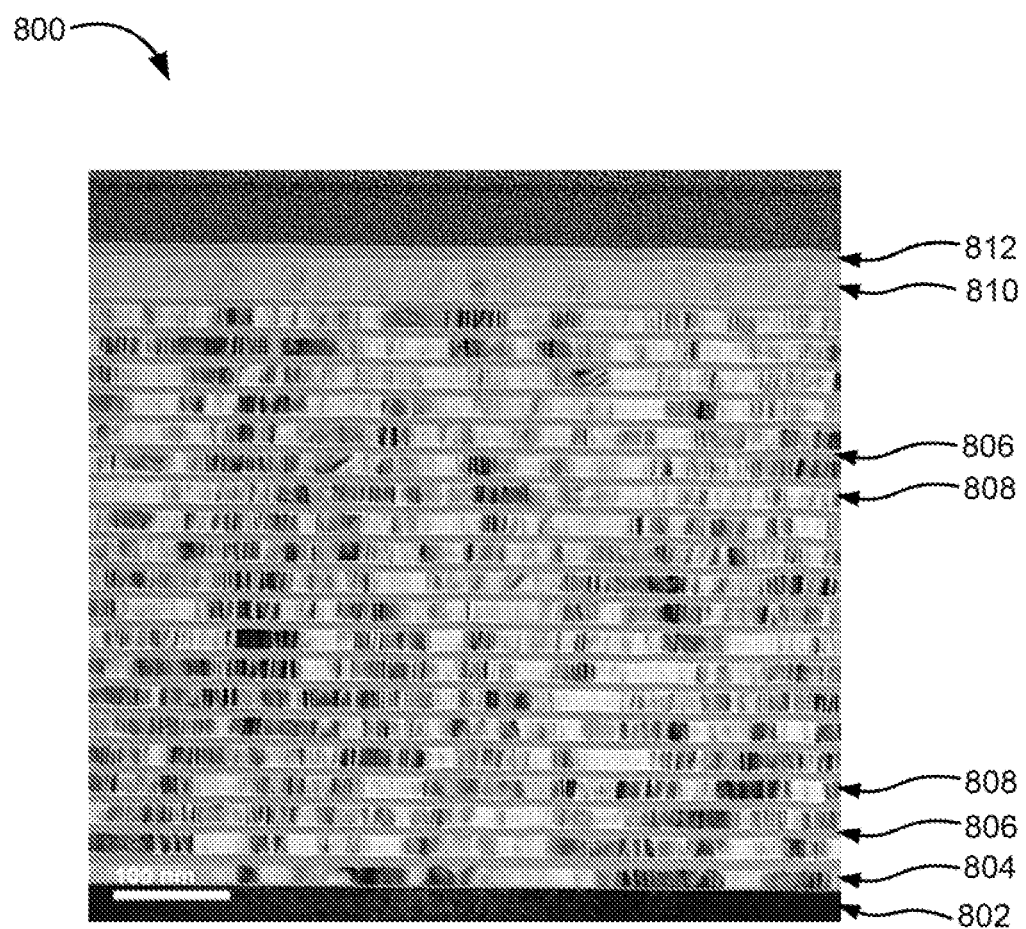
FIG. 8A depicts a cross-sectional view of a thin film structure with corrosion barrier layers, according to one embodiment.

FIG. 8A, on the other hand, depicts a cross-sectional view obtained by TEM, of a tested thin film structure 800 according to one embodiment of the present invention. The thin film structure 800 is an illustrative example of a multilayer structure with improved corrosion protection, according to a conducted experiment. The thin film structure 800 includes a silicon substrate 802, above which is an aluminum corrosion barrier layer 804 as well as a stack of silicon carbide 806 and magnesium 808 sub-layers. Atop the silicon carbide 806 and magnesium 808 sub-layer stack is an interdiffused magnesium aluminum alloy corrosion barrier layer 810; and a final silicon carbide cap layer 812.

Figure 8B:
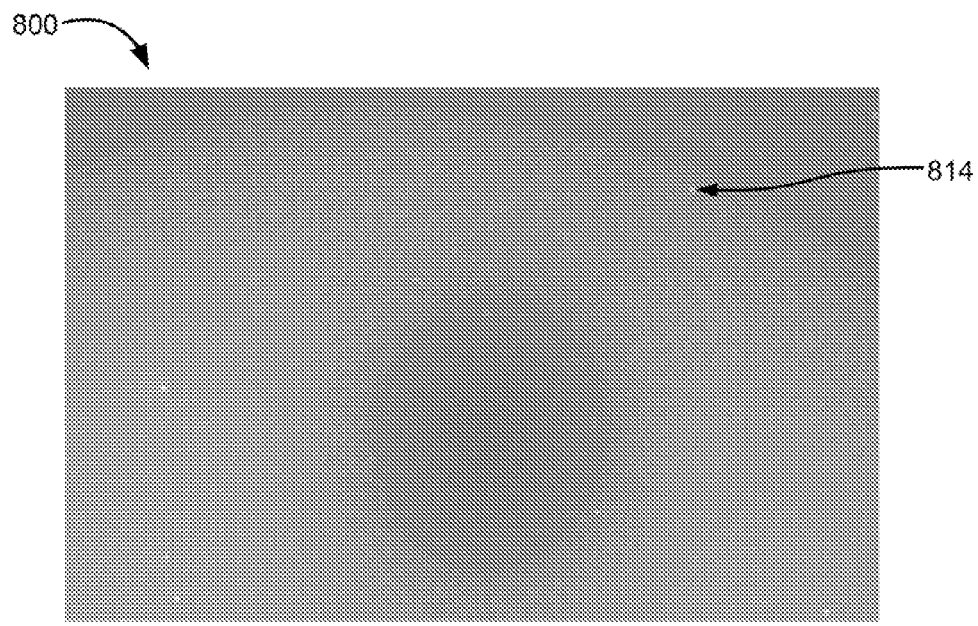
FIG. 8B is a top view of the thin film structure of FIG. 8A.

FIG. 8B depicts a top view of the thin film structure 800 of FIG. 8A, with further magnification, obtained using a SEM. After 3.5 years of aging under the same conditions as the structure of FIG. 6B, it can be seen in FIG. 8B that the number and concentration of corrosion spots 814 has been dramatically reduced, if not eliminated in the sub-layer shown. Without wishing to be bound by any theory, it is believed that, due to reasons explained herein, the exceptional reduction in corrosion spots is at least on part due to the implementation of the aluminum corrosion barrier layer 804 as well as the unexpectedly interdiffused magnesium aluminum alloy corrosion barrier layer 810 to the thin film structure 800.

According to one experiment, the performance of four SiC/Mg multilayer structures corresponding to samples A, B, C and D as depicted in Table 1, were measured around the peak wavelengths noted in Table 1. The reflective performance of the samples listed in Table 1 is additionally plotted in the graph 900 of FIG. 9.

TABLE 1

|  | Sample A | Sample B | Sample C | Sample D |
|---|---|---|---|---|
| Peak wavelength (nm) | 28.9 | 28.9 | 45.7 | 45.7 |
| Peak reflectivity | 42% | 40.5% | 37% | 44% |
| Corrosion barriers | Yes | No | Yes | No |
| Al base corrosion barrier layer (nm) | 12.7 | N/A | 26 | N/A |
| Al top corrosion barrier layer* (nm) | 12.7 | N/A | 26 | N/A |
| Number of sub-layers | 35 | 35 | 20 | 20 |
| Mg layer (nm) within bilayer | 9.9 | 9.8 | 18.9 | 18.1 |
| SiC layer (nm) within bilayer | 5.1 | 5.1 | 6.9 | 7.1 |
| SiC base layer (nm) | 3 | 3 | 3 | 3 |
| SiC cap layer (nm) | 9 | 9 | 9 | 9 |

Both samples A and C of Table 1 correspond to a structure with multilayers equipped with an aluminum as well as an interdiffused aluminum magnesium alloy corrosion barrier layer. For comparison, both samples B and D represent multilayers which did not have corrosion barrier layers. According to the present experiment, all samples were deposited by DC-magnetron sputtering, using Ar process gas at a pressure of about $10^{-3}$ Torr, and a base pressure in the deposition chamber in the range of about $10^{-7}$-$10^{-8}$ Torr. Measurements were made at a near-normal angle of incidence (i.e., at about 5 degrees from normal); moreover, all sub-layers of the multilayer of samples A and C were optimized to maximize protection while minimizing the impact of the peak reflectivity.

The resulting thin film stress in all aforementioned SiC/Mg multilayer samples, regardless of corrosion protection layers, was measured to be around −100 MPa. This measurement is considered to be an extremely low value in comparison to other candidate material pairs, which also have a 5× to 20× higher stress value. As described herein, because higher stress is known to reduce efficiency, the low stress seen in SiC/Mg multilayer samples is a highly desirable characteristic.

Figure 9:
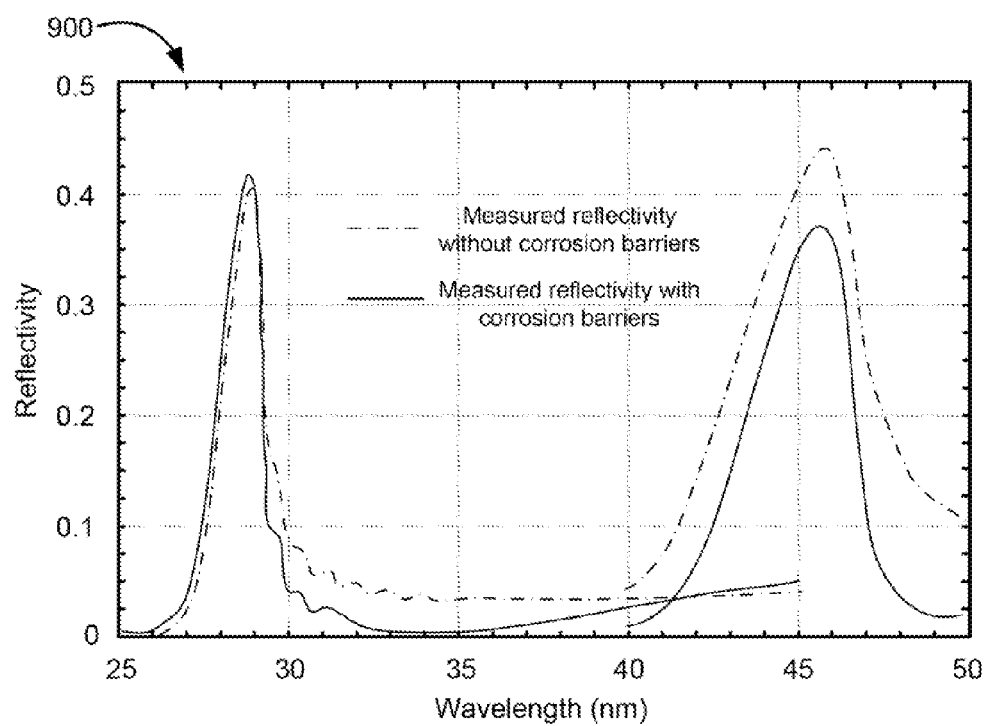
FIG. 9 is a chart depicting reflective performance of various experimental inventive and comparative samples.

Despite these advantages, without the corrosion barrier layers, the corrosive nature of SiC/Mg multilayers make them practically useless due to the onset of corrosion after only a short exposure time. FIG. 9 illustrates a comparison of reflectivity vs. wavelength for SiC/Mg multilayers tested both with and without corrosion protection, as labeled on the graph. It should also be noted that the measured curves shown in FIG. 9 were very close to the modeled curves developed before this experiment was conducted.

Referring to FIG. 9, it is seen that in the lower wavelengths, the reflectivity of the multilayers both with and without corrosion barrier layers had a very similar curve. Moreover, with regard to the higher wavelengths, incorporating corrosion barrier layers only slightly reduced the reflectivity of the multilayer structure. Although for higher wavelengths, the structures with corrosion barrier layers initially performed slightly less efficiently than those without, corrosion quickly altered this. After only a short time, the corrosion described herein attacked the multilayer structures without barrier layers, reducing their effective reflection essentially to zero in the corroded areas. Alternatively, the multilayer structures with corrosion barrier layers maintained a much more constant reflection and have proven to be a much more effective design over time.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A thin film structure, comprising:
a substrate;
a first corrosion barrier layer above the substrate;
a reflective layer above the first corrosion barrier layer, wherein the reflective layer comprises at least one repeating set of sub-layers, wherein one of the sub-layers of each set of sub-layers being of a corrodible material; and
a second corrosion barrier layer above the reflective layer.

2. The thin film structure as recited in claim 1, wherein at least one of the corrosion barrier layers is primarily of aluminum.

3. The thin film structure as recited in claim 1, wherein at least one of the corrosion barrier layers is primarily of a material selected from a group consisting of silicon oxide, sputtered carbon, and boron carbide.

4. The thin film structure as recited in claim 1, further comprising a third corrosion barrier layer between at least two of the sets of sub-layers of the reflective layer.

5. The thin film structure as recited in claim 1, further comprising a third corrosion barrier layer between each of the sets of sub-layers of the reflective layer.

6. The thin film structure as recited in claim 1, wherein the second corrosion barrier layer is a cap layer of the thin film structure.

7. The thin film structure as recited in claim 1, further comprising a cap layer above the second corrosion barrier layer.

8. The thin film structure as recited in claim 1, wherein the second corrosion barrier layer is directly on the reflective layer, wherein the second corrosion barrier layer is an alloy of a corrosion barrier material and a material of an immediately underlying sub-layer of the reflective layer.

9. The thin film structure as recited in claim 8, wherein the second corrosion barrier layer and the immediately underlying sub-layer of the reflective layer constitute an interdiffusion layer having no visible boundary between the second corrosion barrier layer and the immediately underlying sub-layer.

10. The thin film structure as recited in claim 8, wherein the second corrosion barrier layer and the immediately underlying sub-layer of the reflective layer constitute an interdiffusion layer having a mostly amorphous character.

11. The thin film structure as recited in claim 8, wherein the corrosion barrier material consists essentially of aluminum and the immediately underlying sub-layer of the reflective layer comprises magnesium.

12. The thin film structure as recited in claim 1, each set of sub-layers includes at least three sub-layers.

13. A system, comprising an optical element having the thin film structure as recited in claim 1; and an image capture or spectrometer device.

14. The system as recited in claim 13, wherein the optical element is selected from a group consisting of a mirror, a filter, a reflective grating, a diffractive grating, a diffractive lens, a beam splitter, a phase retardation device, and a pulse compression device.

15. A laser, comprising a light source and the thin film structure as recited in claim 1.

16. A thin film structure, comprising:
a substrate;
a first corrosion barrier layer above the substrate;
a reflective layer above the first corrosion barrier layer, wherein the reflective layer comprises at least one repeating set of sub-layers, wherein one of the sub-layers of each set of sub-layers being primarily of magnesium; and
a second corrosion barrier layer above the reflective layer, wherein at least one of the corrosion barrier layers primarily of a material selected from a group consisting of aluminum, silicon oxide, sputtered carbon, and boron carbide.

17. The thin film structure as recited in claim 16, further comprising a third corrosion barrier layer between at least two of the sets of sub-layers of the reflective layer.

18. The thin film structure as recited in claim 16, further comprising a third corrosion barrier layer between each of the sets of sub-layers of the reflective layer.

19. The thin film structure as recited in claim 16, wherein the second corrosion barrier layer is a cap layer of the thin film structure.

20. The thin film structure as recited in claim 16, further comprising a cap layer above the second corrosion barrier layer.

21. The thin film structure as recited in claim 16, wherein the second corrosion barrier layer is directly on the reflective layer, wherein the second corrosion barrier layer is an alloy of a corrosion barrier material and a material of an immediately underlying sub-layer of the reflective layer.

22. The thin film structure as recited in claim 21, wherein the second corrosion barrier layer and the immediately underlying sub-layer of the reflective layer constitute an interdiffusion layer having no visible boundary between the second corrosion barrier layer and the immediately underlying sub-layer.

23. The thin film structure as recited in claim 21, wherein the corrosion barrier material consists essentially of aluminum and the immediately underlying sub-layer of the reflective layer comprises magnesium.

24. The thin film structure as recited in claim 21, wherein the second corrosion barrier layer and the immediately underlying sub-layer of the reflective layer constitute an interdiffusion layer having a mostly amorphous character.

25. The thin film structure as recited in claim 16, each set of sub-layers includes at least three sub-layers.

26. The thin film structure as recited in claim 16, wherein the sub-layers of each set include a sub-layer comprising primarily silicon carbide.

27. A system, comprising an optical element having the thin film structure as recited in claim 16; and an image capture or spectrometer device.

28. The system as recited in claim 27, wherein the optical element is selected from a group consisting of a mirror, a filter, a reflective grating, a diffractive grating, a diffractive lens, a beam splitter, a phase retardation device, and a pulse compression device.

29. A laser, comprising a light source and the thin film structure as recited in claim 16.

* * * * *